United States Patent
Gilbertson et al.

(10) Patent No.: US 8,356,783 B1
(45) Date of Patent: Jan. 22, 2013

(54) RETRACTABLE STOP ASSEMBLY FOR A CART

(76) Inventors: Greg Gilbertson, Chippewa Falls, WI (US); Jeremy Abbott, Eau Claire, WI (US)

( * ) Notice: Subject to any disclaimer, the term of this patent is extended or adjusted under 35 U.S.C. 154(b) by 641 days.

(21) Appl. No.: 12/584,546

(22) Filed: Sep. 8, 2009

Related U.S. Application Data (60) Provisional application No. 61/191,233, filed on Sep. 8, 2008.

(51) Int. Cl.
    *B62B 5/00* (2006.01)
(52) U.S. Cl. .............. 248/224.7; 280/79.11; 24/514
(58) Field of Classification Search ........... 248/316.1, 248/316.2, 316.6, 251, 221.11, 224.7, 229.1, 248/229.11, 689, 690, 691, 692; 280/79.11, 280/79.3, 33.992; 24/514, 519, 569
    See application file for complete search history.

(56) References Cited

U.S. PATENT DOCUMENTS

| | | | |
|---|---|---|---|
| 2,466,149 A | 4/1949 | Burg | |
| 3,417,877 A | 12/1968 | Corley | |
| 5,037,117 A | 8/1991 | Hershberger | |
| 5,042,222 A | 8/1991 | Guthrie | |
| 5,277,346 A * | 1/1994 | Stier | 224/509 |
| 5,460,469 A | 10/1995 | Young | |
| 5,584,399 A | 12/1996 | King | |
| 6,032,966 A | 3/2000 | Young | |
| 6,059,300 A * | 5/2000 | Wu | 280/47.2 |
| 6,138,972 A * | 10/2000 | Votruba | 248/317 |
| 6,286,192 B2 * | 9/2001 | Pfister | 24/514 |
| 6,786,503 B1 | 9/2004 | Young | |
| 6,866,274 B1 | 3/2005 | Muscat | |
| 6,957,795 B1 * | 10/2005 | Hsieh | 248/316.4 |
| 7,159,832 B2 * | 1/2007 | Easterling | 248/316.6 |
| 2009/0200443 A1 * | 8/2009 | Burtscher et al. | 248/316.1 |

* cited by examiner

*Primary Examiner* — Terrell McKinnon
*Assistant Examiner* — Steven Marsh
(74) *Attorney, Agent, or Firm* — Tipton L. Randall (57) ABSTRACT

A retractable stop assembly rigidly attached to an underside of a cart for sheet material. The retractable stop assembly includes a base plate member adapted for rigid attachment to an underside of a cart adjacent an edge thereof. A mounting bracket unit is rotatably attached to the base plate member opposite the underside of the cart by a threaded fastener. The mounting bracket unit includes a cylindrical sleeve member rigidly secured thereto with the cylindrical sleeve member's central axis parallel with the base plate member. An L-shaped stop member has first and second leg sections. The first leg section is movably positioned within the cylindrical sleeve member, and the second leg section is movable to extend above the edge of the cart. Rotation of the threaded fastener member in a selected direction rigidly clamps the L-shaped stop member in a selected orientation within the cylindrical sleeve member.

5 Claims, 6 Drawing Sheets

RETRACTABLE STOP ASSEMBLY FOR A CART

CROSS-REFERENCE TO RELATED APPLICATIONS, IF ANY

This application claims the benefit under 35 U.S.C. §119 (e) of co-pending provisional application Ser. No. 61/191,233, filed 8 Sep. 2008. Application Ser. No. 61/191,233 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a stop assembly and, more particularly, to a stop assembly for use with a cart for sheet material and, most particularly, to a stop assembly for use with a cart for sheet material that readily extends and retracts, and yet is unobtrusive in a storage position.

2. Background Information

Hand carts or motorized carts are routinely employed for transporting sheet materials, including paneling, drywall, doors, tables, etc. Such a cart usually includes one side that extends upwardly from the base of the cart to support the sheet material. There must be some type of stop on the opposite side of the cart to prevent the sheet material from sliding off that side of the cart. Any permanent stop must be worked around when loading and unloading the sheet material from the cart. Various sized loads must also be accommodated by the stop. Several devices concerned with carts for transporting planar sheet material have been granted patents, including the following.

Burg, in U.S. Pat. No. 2,466,149, describes a stock pickup and carrier truck for handling sheets of material. The four-wheeled truck includes several metal legs with lip ends that extend from the truck to pick up and hold stacks of sheet material.

In U.S. Pat. No. 3,417,877, Corley discloses a movable cart for handling a substantially flat structural member. The mounting structure for supporting the member includes a universal pivot joint that permits the mounting structure to be moved about the pivot between the horizontal and vertical planes, through an angle of at least 90 degrees, and rotated in a horizontal plane, through an angle of at least 180 degrees. Movable stops connected to the cart frame are adjusted so that when the mounting structure is against the stops in the vertical position, the structural member is aligned in the vertical plane. Spacers index the cart with respect to a vertical surface for setting the structural member into position.

Hershberger, in U.S. Pat. No. 5,037,117, describes a caddie for stacking, storing and transporting folding leg tables. The dollies are on casters and are simply constructed with a base and riser member. Locking bars, extending from the risers of each dolly, engage the edges of the first table to be stacked on the caddie. The dollies fold flat for storage. Note, in particular, the edge supports that hold the tables on the cart.

In U.S. Pat. No. 5,042,222, Guthrie discloses a drywall slide board. The drywall slideboard consists of upper and lower hinge plates separated by a horizontal hinge. The upper hinge plate supports a removable top plate, which in turn supports a slide plate of a relatively low friction coefficient material. The lower hinge plate is supported by retaining members, which permit the drywall slideboard to be temporarily installed upon a section of lumber stock, such as a two-by-four for use. Alternatively, the top plate and slide plate may be easily removed from the remainder of the slideboard. Methods of use are further described in which the drywall slideboard may be installed over a two-by-four or similar material at a window opening and used to facilitate the transfer of building materials into or out of the structure. Alternatively, the drywall slideboard may be used to transfer materials up or down a stairway when only the top plate and slide plate are used.

Young, in U.S. Pat. No. 5,460,469, describes a panel lifting apparatus having a U-shaped horizontal frame with rollers mounted along the bottom for transporting the frame from place to place. A pair of inclined channels is mounted in spaced relation along the apex of the frame. A pair of hooks having rod like extensions are each mounted on a frame having rollers for rolling along the inclined channels to roll the hooks upward and downward along the inclined channels. A crank and drum are rotatably mounted on one of said channels. A cable has its ends attached to the pair of hooks and an intermediate portion extending through the drum. Rotation of the drum by the crank in one direction causes the cables to wind in opposite directions on the same drum to wind the ends of the cables upward, simultaneously, and thereby draw the hooks upward on the channels, simultaneously. The channels extend sufficiently downward to be adjacent the frame rollers and the ground that the hooks may be lowered by the crank to immediate adjacency to the ground and to receive a drywall panel thereon adjacent the ground. The hooks may lift the panel up to a height where they may be transferred onto a panel lifter having an extended height capability.

In U.S. Pat. No. 5,584,399, King discloses a unique framing system, which provides efficient use of floor space for storing panel members in any one of several desired configurations. The several interactive components of the system interfit easily, such that the system may be tailored into a variety of configurations to suit a particular application. Wheel assemblies may be mounted at each end of the frame assembly and are also configured for easy application and removal. Note, in particular, FIG. 10.

Young, in U.S. Pat. No. 6,032,966, describes a bulk drywall rolling support device. The device has a near horizontal frame, with its forward end inclined upward in relation to its rearward end. The frame has a pair of beams on each side with a lateral bar fixed between the beams. A pair of upward extending sleeves is mounted on the outside of each beam. A pair of rods is adapted to be slidably inserted into the sleeves and extend upward and slightly rearward therefrom. The device has four wheels mounted at the corners of the device. Each rod has a handle near its upper portion for grasping by an operator for rolling the support device about on its wheels. The device is adapted to receive drywall panels, with the lower edge of the panels resting onto forward and upward inclined beams, and the rear sides of the panels resting against the rods. The device has storage ledges for storing the rods when not in use and a mechanism to lock the rods in their storage position so that the handle on one of the rods may be used to lift the rod and the device.

In U.S. Pat. No. 6,786,503, Young discloses a panel carrying cart, having an elongated overall frame formed of a pair of elongated frame sections pivotally mounted about a horizontal axis at their inner ends. The frame sections are each formed of a pair of parallel rods and upright end frames. A plurality of lateral frame rods is adjustably mounted along the length of the parallel rods of the front and rear frames so that the lateral rods may be moved to different locations to better accommodate loads carried on the lateral rods of the cart. A pair of L-shaped lateral rods each has one end mounted in the lateral rods, with their other ends extending upward to hold panels or other objects on the lateral frames on the cart. Wheels are mounted to the front and rear frames for moving the cart about to different locations with panels or other object thereon.

Muscat, in U.S. Pat. No. 6,866,274, describes an article transport dolly for transporting sheets of drywall, glass and the like from one site location to another. The article transport dolly includes an article carrier member, including a base having a top surface upon which articles can be carried. A non-slip mat member is disposed upon the top surface of the base to prevent articles from sliding thereupon. A spring plate comprises a sheet of rigid material upon which the article carrier member is mounted. A carrying handle/stand is attached to the article carrier member for standing the article carrier member upon a ground and for carrying the article carrier member. A wheel assembly includes an axle upon which the spring plate is securely mounted. A brake assembly includes brakes mounted to the article carrier member for braking the wheel assembly.

Applicants have devised a retractable stop assembly for attachment to a cart for sheet material that is highly versatile and stores in an unobtrusive position.

SUMMARY OF THE INVENTION

The invention is directed to a retractable stop assembly, adapted for rigid attachment to an underside of a cart for sheet material. The retractable stop assembly includes a base plate member, adapted for rigid attachment to an underside of a cart adjacent an edge thereof. A mounting bracket unit is rotatably attached to the base plate member opposite the underside of the cart by a threaded fastener member. The mounting bracket unit includes a cylindrical sleeve member, rigidly secured thereto with the cylindrical sleeve member's central axis parallel with the base plate member. An L-shaped stop member has first and second leg sections. The first leg section is movably positioned within the cylindrical sleeve member, and the second leg section is movable to extend above the edge of the cart. Rotation of the threaded fastener member in a selected direction rigidly clamps the L-shaped stop member in a selected orientation within the cylindrical sleeve member.

In a preferred embodiment of the invention, the mounting bracket unit includes first and second bracket plate members in register. The threaded fastener member penetrates the bracket plate members and the base plate member for rotatably securing the mounting bracket unit to the base plate member. Preferably, the threaded fastener member includes a threaded nut, secured to the base plate member adjacent the underside of the cart, and a threaded shaft penetrating the base plate member and the mounting bracket plate members. A first end of the threaded shaft engages the threaded nut, and a handle is attached to the threaded shaft at a second end thereof.

DESCRIPTION OF THE EMBODIMENTS

Nomenclature

| | |
|---|---|
| 10 | Retractable Stop Assembly |
| 20 | Base Plate Member |
| 25 | Mounting Screws for Base Plate Member |
| 30 | Mounting Bracket Unit |
| 32 | First Bracket Plate Member |
| 34 | Second Bracket Plate Member |
| 36 | Spacer Section of Second Bracket Plate Member |
| 40 | Threaded Fastener Member |
| 42 | Threaded Nut of Fastener Member |
| 44 | Threaded Shaft of Fastener Member |
| 45 | First End of Threaded Shaft |
| 46 | Second End of Threaded Shaft |
| 47 | Washer of Fastener Member |
| 48 | Handle of Fastener Member |
| 50 | Cylindrical Sleeve Member |
| 55 | Slot in Sleeve Member |
| 60 | L-shaped Stop Member |
| 62 | First Leg of Stop Member |
| 64 | Second Leg of Stop Member |
| A | Central Axis of Sleeve Member |
| C | Cart for Sheet Material |
| E | Edge of Cart |

Construction

The invention is a retractable stop assembly, adapted for rigid attachment to an underside of a cart for sheet material. The retractable stop assembly includes a base plate member, adapted for rigid attachment to an underside of a cart adjacent an edge thereof. A mounting bracket unit is rotatably attached to the base plate member opposite the underside of the cart by a threaded fastener member. The mounting bracket unit includes a cylindrical sleeve member, rigidly secured thereto with the cylindrical sleeve member's central axis parallel with the base plate member. An L-shaped stop member has first and second leg sections. The first leg section is movably positioned within the cylindrical sleeve member, and the second leg section is movable to extend above the edge of the cart. Rotation of the threaded fastener member in a selected direction rigidly clamps the L-shaped stop member in a selected orientation within the cylindrical sleeve member.

In a preferred embodiment of the invention, the mounting bracket unit includes first and second bracket plate members in register. A threaded fastener member penetrates the bracket plate members and the base plate member for rotatably securing the mounting bracket unit to the base plate member. Preferably, the threaded fastener member includes a threaded nut, secured to the base plate member adjacent the underside of the cart, and a threaded shaft penetrating the base plate member and the mounting bracket plate members. A first end of the threaded shaft engages the threaded nut, and a handle is attached to the threaded shaft at a second end thereof.

Figure 1:
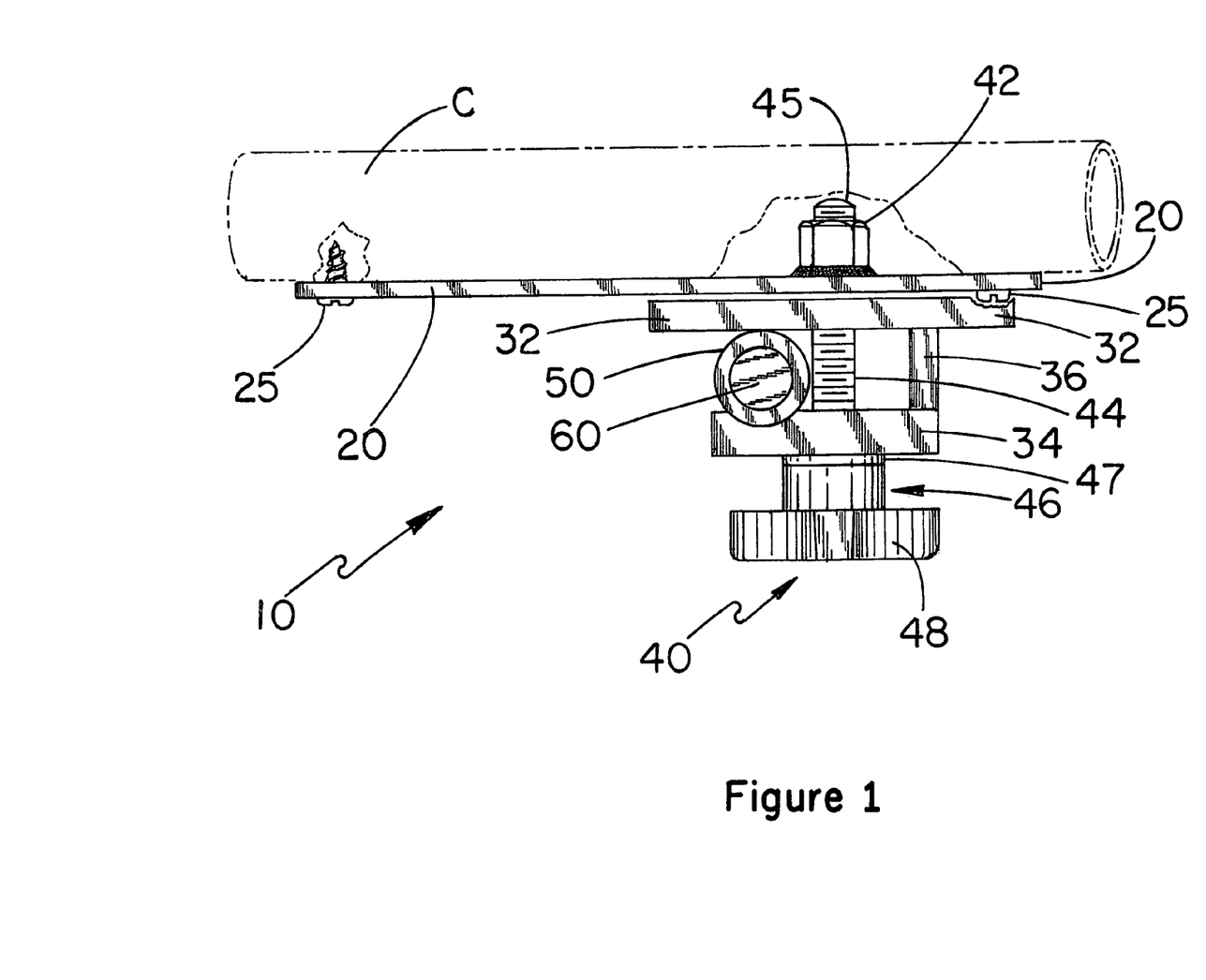
FIG. 1 is a perspective side view of the retractable stop assembly of the present invention.
Figure 2:
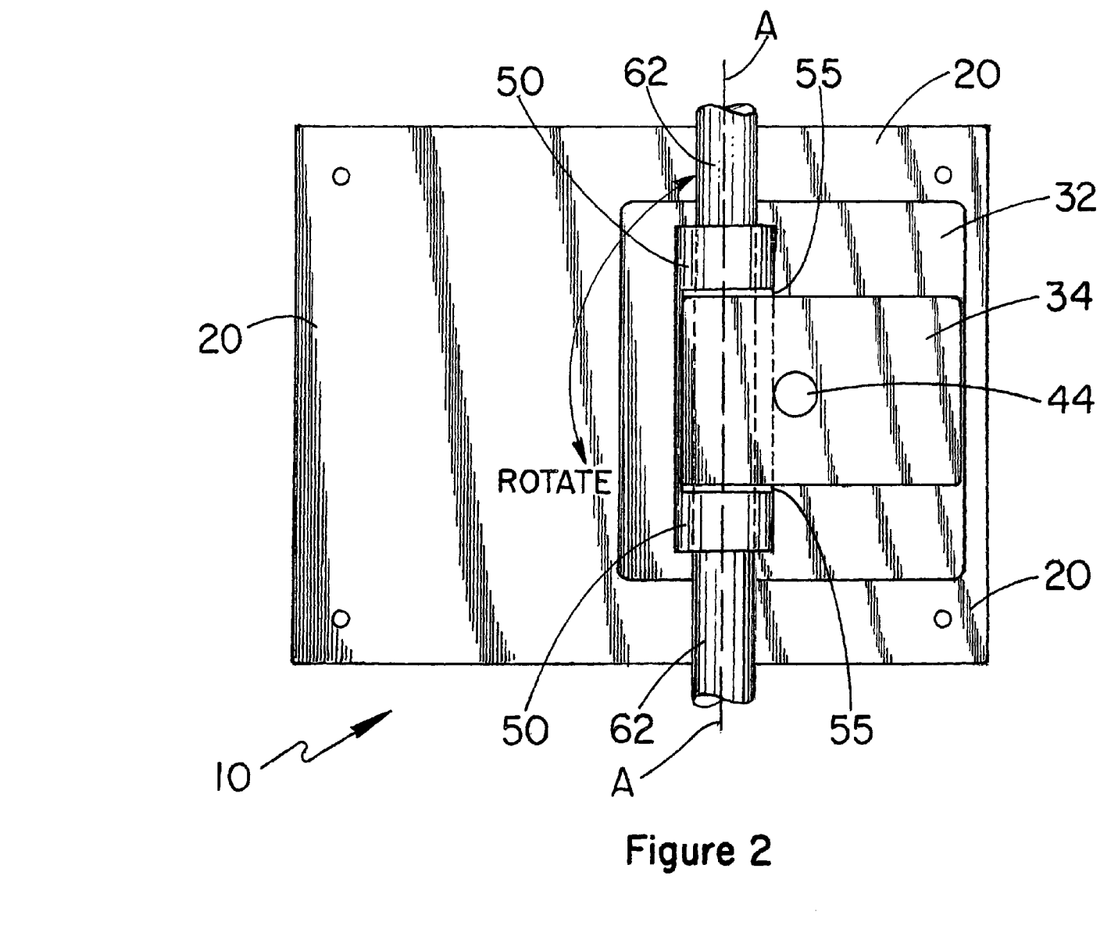
FIG. 2 is a bottom view of the retractable stop assembly of the present invention.

Referring now to FIGS. 1 and 2, a side view and a bottom view of the retractable stop assembly 10 are shown. The retractable stop assembly 10 is adapted for rigid attachment to an underside of a cart C, which is used for transporting sheet material. The retractable stop assembly 10 includes a base plate member 20, adapted for rigid attachment to an underside of a cart C adjacent to an edge E of the cart. The base plate member 20 preferably measures about 4"×6" and includes apertures at the corners for attaching the base plate member 20 to the bottom of the cart C. As shown in FIG. 1, the base plate member 20 is secured to the cart C with mounting screws 25.

A mounting bracket unit 30 is rotatably attached to the base plate member 20 opposite the underside of the cart C by a threaded fastener member 40. The mounting bracket unit 30 includes a cylindrical sleeve member 50 rigidly secured thereto, with the cylindrical sleeve member's central axis A oriented parallel with the base plate member 20.

In a preferred embodiment of the invention, the mounting bracket unit 30 includes first bracket plate member 32 and second bracket plate member 34 in register. A threaded fastener member 40 penetrates the bracket plate members 32, 34 and the base plate member 20 for rotatably securing the mounting bracket unit 30 to the base plate member 20. Most preferably, the cylindrical sleeve member 50 is rigidly secured to one of the mounting bracket plate members 32, and the sleeve member 50 includes a slot 55 sized to accommodate a section of the other mounting bracket plate member 34, thereby allowing clamping contact of the section of the mounting plate member 34, with the L-shaped stop member 60 positioned within the cylindrical sleeve member 50, as described below.

Preferably, the threaded fastener member 40 includes a threaded nut 42, secured to the base plate member 20 adjacent the underside of the cart C, and a threaded shaft 44 penetrating the base plate member 20 and the mounting bracket plate members 32, 34. A first end 45 of the threaded shaft 44 engages the threaded nut 42, and a handle 48 is attached to the threaded shaft 44 at a second end 46 thereof, with the handle 48 contacting the second bracket plate member 34.

Figure 4:
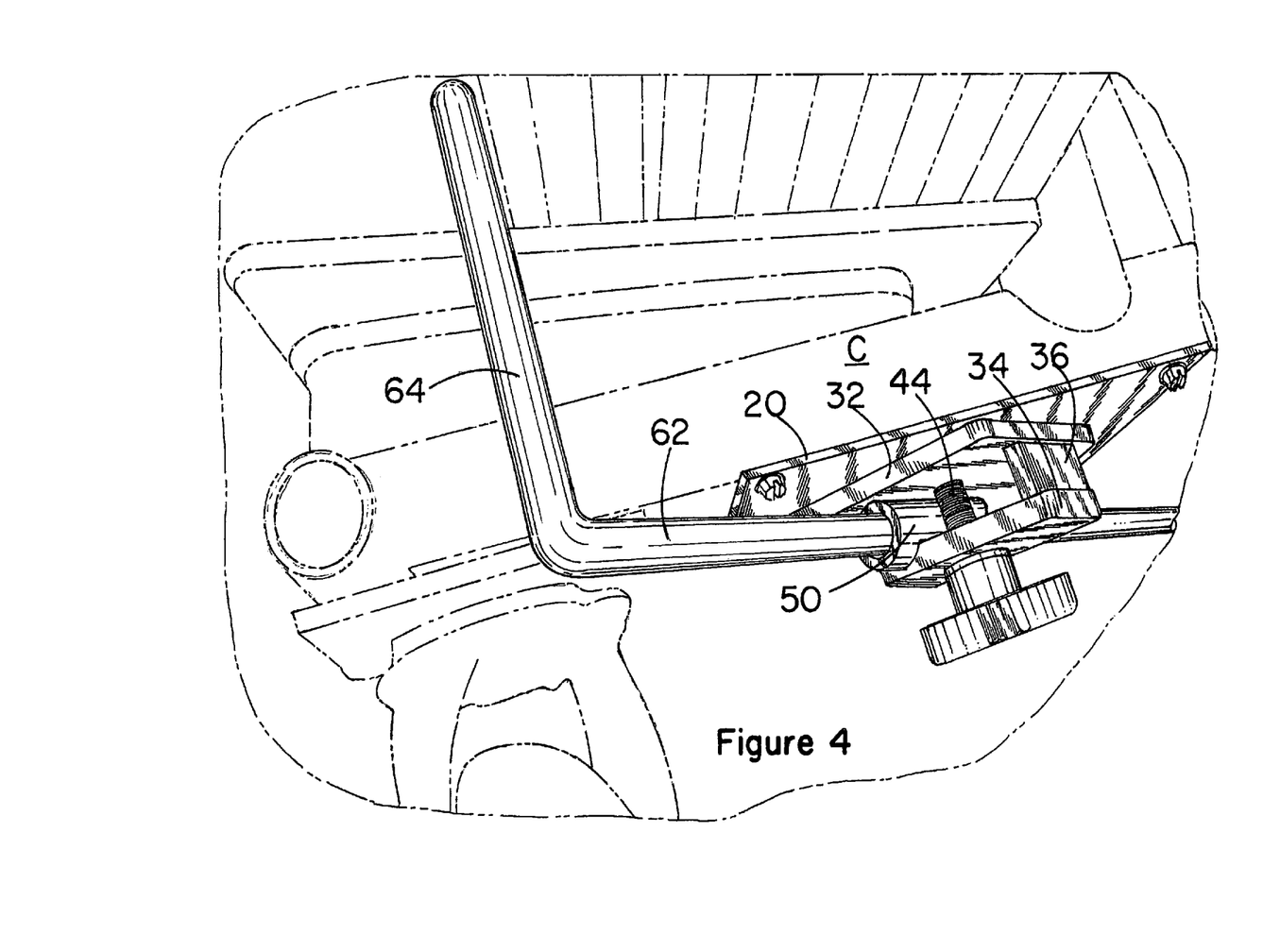
FIG. 4 is another perspective side view of the retractable stop assembly of the present invention attached to a cart with the stop in the deployed position.

An L-shaped stop member 60 has a first leg section 62 and a second leg section 64. The first leg section 62 is movably positioned within the cylindrical sleeve member 50, and the second leg section 64 is movable to extend above the edge E of the cart C to prevent sheet material from sliding off the cart C, as shown in FIG. 4. Rotation of the threaded fastener member 40 in a selected direction rigidly clamps the L-shaped stop member 60 in a selected orientation within the cylindrical sleeve member 50.

Figure 3:
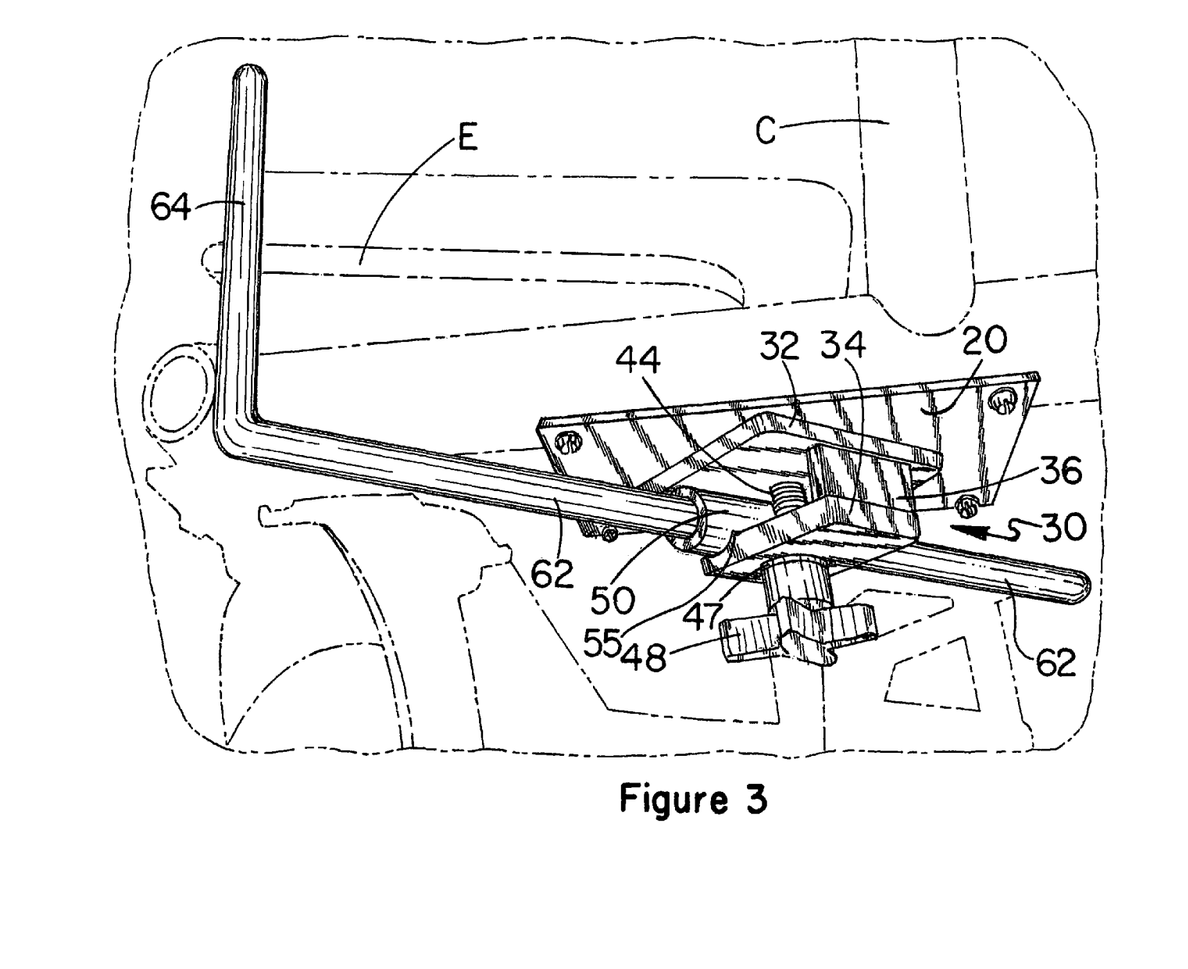
FIG. 3 is a perspective side view of the retractable stop assembly of the present invention attached to a cart with the stop in the deployed position.

The multiple adjustment features of the retractable stop assembly 10 provides extreme versatility in deploying and storing the L-shaped stop member 60 on the cart C. The L-shaped stop member 60 is shown in a deployed state in FIGS. 3 and 4 and in a stored state in FIGS. 5 and 6. The first leg 62 of the L-shaped stop member 60 is linearly movable within the sleeve member 50 so that the second leg 64 of the L-shaped stop member 60, extending upwardly above the edge E of the cart C, can accommodate various sized loads of sheet material on the cart C. The rotational feature of the mounting bracket unit 30 allows the upwardly extending second leg 64 of the L-shaped stop member 60 to stay close to the edge E of the cart C.

Figure 5:
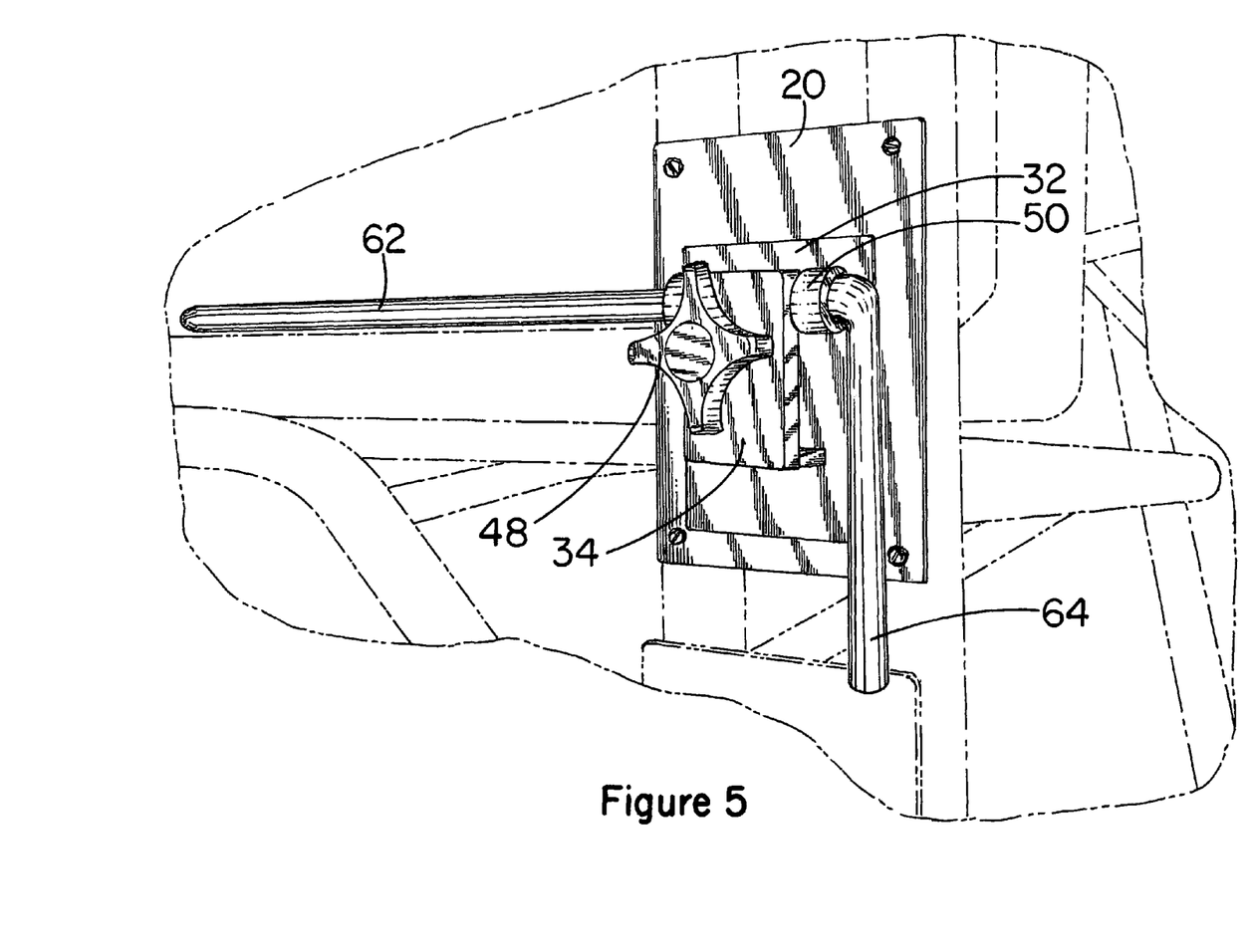
FIG. 5 is a perspective bottom view of the retractable stop assembly of the present invention attached to a cart with the stop in the retracted position.
Figure 6:
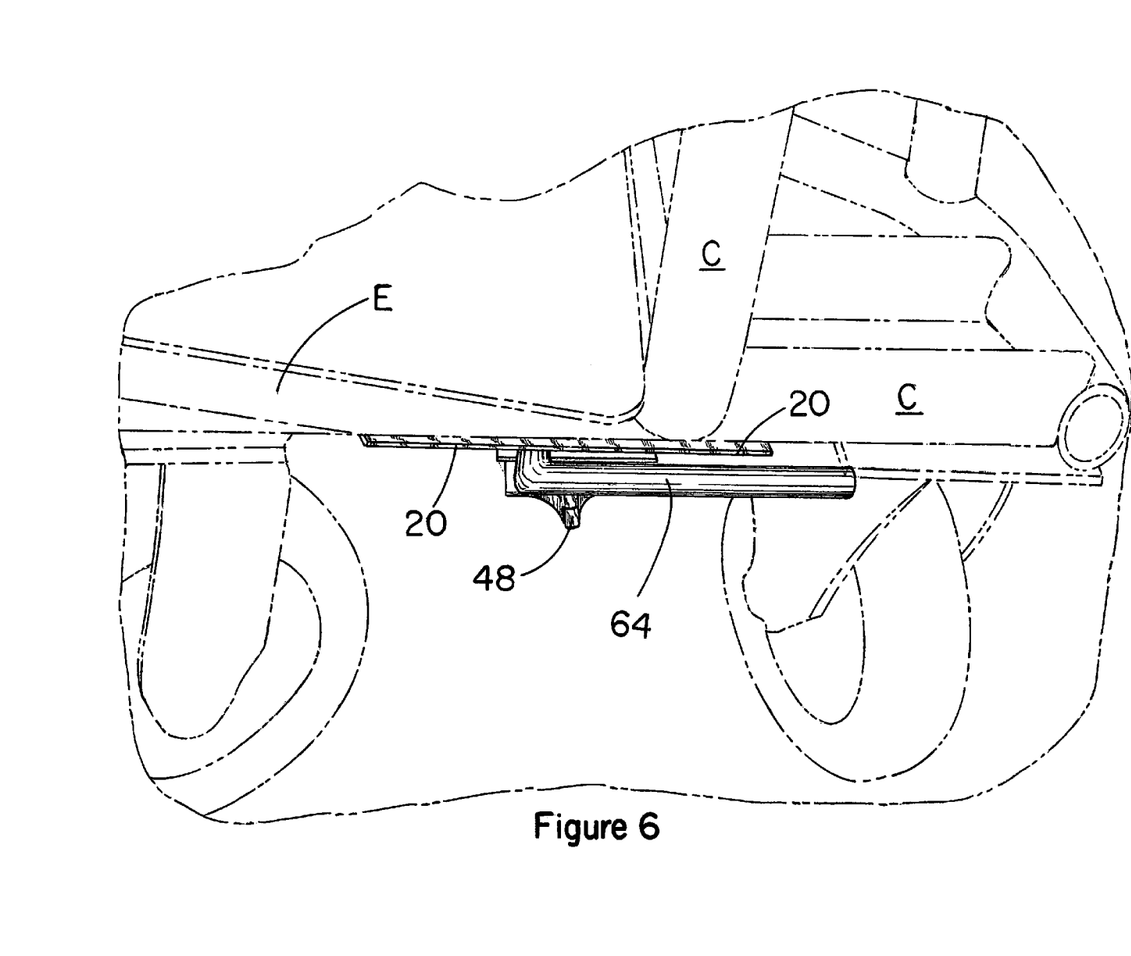
FIG. 6 is a perspective side view of the retractable stop assembly of the present invention attached to a cart with the stop in the retracted position.

The first leg 62 of the L-shaped stop member 60 is also rotatably movable within the sleeve member 50 so that the second leg 64 of the L-shaped stop member 60 can be rotated to a horizontal orientation and stored beneath the cart C, as illustrated in FIGS. 5 and 6. Thus, the retractable stop assembly 10 is always available for use with the cart C. Most preferably, a pair of retractable stop assemblies 10 is employed, with one assembly 10 at each end of the cart C.

While the invention has been particularly shown and described with reference to preferred embodiments thereof, it will be understood by those skilled in the art that various changes in form and details may be made therein without departing from the spirit and scope of the invention.

We claim:

1. A retractable stop assembly adapted for rigid attachment to an underside of a cart for sheet material, the retractable stop assembly comprising:

a base plate member adapted for rigid attachment to an underside of a cart adjacent an edge thereof;

a mounting bracket unit rotatably attached to the base plate member opposite the underside of the cart by a threaded fastener, the mounting bracket unit including first and second bracket plate members in register with the threaded fastener member penetrating the bracket plate members and the base plate member for rotatably securing the mounting bracket unit to the base plate member;

a cylindrical sleeve member rigidly secured between the first and second bracket plate members with the cylindrical sleeve member's central axis parallel with the base plate member; and an L-shaped stop member with first and second leg sections, the first leg section movably positioned within the cylindrical sleeve member, and the second leg section movable to extend above the edge of the cart;

whereby rotation of the threaded fastener member in a selected direction rigidly clamps the L-shaped stop member in a selected orientation within the cylindrical sleeve member.

2. The retractable stop assembly adapted for rigid attachment to an underside of a cart for sheet material of claim 1, wherein the threaded fastener member includes a threaded nut secured to the base plate member adjacent the underside of the cart, a threaded shaft penetrating the base plate member and the mounting bracket member, with a first end of the threaded shaft engaging the threaded nut and a handle attached to the threaded shaft at a second end thereof.

3. The retractable stop assembly adapted for rigid attachment to an underside of a cart for sheet material of claim 1, wherein the cylindrical sleeve member is rigidly secured to one of the mounting bracket plate members, the sleeve member including a slot sized to accommodate a section of the other mounting bracket plate member, thereby allowing clamping contact of the section of the mounting plate member with the L-shaped member within the cylindrical sleeve member.

4. A retractable stop assembly adapted for rigid attachment to an underside of a cart for sheet material, the retractable stop assembly comprising:

a base plate member adapted for rigid attachment to an underside of a cart adjacent an edge thereof;

a mounting bracket unit rotatably attached to the base plate member opposite the underside of the cart, the mounting bracket unit including first and second bracket plate members in register, and with a threaded fastener member penetrating the bracket plate members and the base plate member for rotatably securing the mounting bracket unit to the base plate member;

the first bracket plate member having a cylindrical sleeve member rigidly secured thereto with the cylindrical sleeve member positioned between the first and second bracket plate members with a central axis parallel with the first bracket plate member, the cylindrical sleeve member having a slot therein opposite the first bracket plate member, the slot sized to accommodate a section of the second bracket plate member;

the second bracket plate member having a spacer section rigidly secured thereto and positioned between the second and first bracket plate members opposite the cylindrical sleeve member; and an L-shaped stop member with first and second leg sections, the first leg section movably positioned within the cylindrical sleeve member;

whereby rotation of the threaded fastener member in a selected direction draws the first and second bracket plate members together, thereby contacting the spacer section of the second bracket plate member with the first bracket plate member and contacting the section of the first bracket plate member within the cylindrical sleeve member's slot with the first leg section of the L-shaped stop member, thereby rigidly clamping the L-shaped stop member in a selected orientation.

5. The retractable stop assembly adapted for rigid attachment to an underside of a cart for sheet material of claim 4, wherein the threaded fastener member includes a threaded nut fastened to the base plate member adjacent the under side of the cart, a threaded shaft penetrating the bracket plate members and the base plate member with a first end engaging the threaded nut, and a handle attached to the threaded shaft at a second end thereof.

* * * * *